(12) United States Patent  (10) Patent No.: US 6,351,989 B1
Foss  (45) Date of Patent: Mar. 5, 2002

(54) APPARATUS AND METHOD FOR MEASURING INFILTRATION FLOW RATE

(75) Inventor: John F. Foss, Okemos, MI (US)

(73) Assignee: Michigan State University, Board of Trustees Operating Michigan State University, East Lansing, MI (US)

( * ) Notice: Subject to any disclaimer, the term of this patent is extended or adjusted under 35 U.S.C. 154(b) by 0 days.

(21) Appl. No.: 09/335,107

(22) Filed: Jun. 17, 1999

(51) Int. Cl.[7] .................................................. B60H 1/26
(52) U.S. Cl. ...................... 73/118.1; 73/117.1; 73/118.2
(58) Field of Search ................... 73/116, 117.2, 73/117.3, 118.1, 118.2, 117.1; 340/425.5, 438

(56) References Cited

U.S. PATENT DOCUMENTS

| | | | |
|---|---|---|---|
| 3,733,900 A | 5/1973 | De Baun | 73/212 |
| 3,953,126 A | 4/1976 | Kim et al. | 356/28 |
| 4,163,390 A | 8/1979 | Rodder | 73/204 |
| 4,201,467 A | 5/1980 | Hartmann et al. | 356/28 |
| 4,562,744 A | 1/1986 | Hall et al. | 73/861.02 |
| 4,638,233 A | 1/1987 | Erdman | 318/644 |
| 4,706,492 A | 11/1987 | Jones, Jr. et al. | 73/3 |
| 4,766,323 A | 8/1988 | Franklin et al. | 250/561 |
| 4,823,591 A | 4/1989 | Lewis | 73/3 |
| 4,905,511 A | 3/1990 | Reinhold | 73/168 |
| 4,930,343 A | 6/1990 | Johnson | 73/196 |
| 5,131,741 A | 7/1992 | Zweben | 356/28 |
| 5,756,360 A | * 5/1998 | Harvey et al. | 73/23.31 |
| 5,954,577 A | * 9/1999 | Meckler | |
| 5,980,378 A | * 11/1999 | Wieszt | |

* cited by examiner

*Primary Examiner*—Eric S. McCall
(74) *Attorney, Agent, or Firm*—Brinks Hofer Gilson & Lione (57) ABSTRACT

An apparatus and method for measuring the infiltration flow rate into the passenger compartment of a moving motor vehicle includes a controlled source of a distinct, miscible gas such as carbon dioxide ($CO_2$) a plurality of sensors disposed about the compartment to continuously monitor the concentration of such miscible gas over time and a multi-channel data storage device which discretely stores the concentration data from such plurality of sensors for later analysis and computation. The decay rate of the miscible gas concentration is a function of the infiltration/exfiltration rate.

26 Claims, 11 Drawing Sheets

APPARATUS AND METHOD FOR MEASURING INFILTRATION FLOW RATE

BACKGROUND OF THE INVENTION

Motor vehicle manufacturers continue to study, improve and refine their products. Nearly every aspect of motor vehicle performance is under scrutiny. Passenger cars, sport utility vehicles and pickup trucks are significant objects of such study in areas of passenger comfort. One of the more esoteric areas under examination is cabin (passenger compartment) air infiltration and exfiltration. The flow of air into and out of the cabin affects not only noise levels and thus passenger comfort but also heating and cooling requirements. As permitted and average actual highway speeds again increase, proper understanding and quantitative analysis of air infiltration and exfiltration takes on added importance.

The infiltration/exfiltration of air during the forward motion of a "closed" vehicle is an undesirable but natural phenomena associated with the non-uniform pressure values at the external surface of the vehicle and the numerous small openings between various passenger compartment components such as doors and door openings. Such infiltration and the corresponding exfiltration is the result of the relative motion between the vehicle and the surrounding air which creates positive pressure on the forward region of the vehicle and negative pressure over the remainder of the vehicle's perimeter. Such positive and negative pressures exist with respect to the undisturbed ambient pressure.

Since the perimeter area that experiences negative pressure values is considerably larger than the area that experiences positive pressure, it can be expected that, in general, the passenger compartment will adopt a subatmospheric pressure condition at forward speeds.

The consequence of this is that the infiltration mass flow rate:

$$\dot{m}_{in} = \left| \int_{A_{in}} \rho \vec{V} \cdot \hat{n} dA \right|, \quad (1)$$

will be non-zero. (By convention, $\hat{n}$ is the outward drawn normal and, hence, the integral value is negative if the control surface surrounds the vehicle. The symbol "$A_{in}$" represents the total of the infiltration areas.) The $\rho$ of equation (1) is that of the ambient air and, given the condition that $V_{vehicle}/a_{ambient} < 0.2$ where a=the speed of sound in the ambient, the entering $\rho$ is safely assumed to be that of the atmosphere. In a steady state, the entering and exiting $\dot{m}$ values are equal and this value ($\dot{m}_{in}$) will be referred to as the "infiltration rate" although it, of course, with equal accuracy quantitatively represents the exfiltration rate.

The fact that $\dot{m}_{in}$ is distributed over the forward region of the motor vehicle makes its direct assessment quite difficult. A stratagem to measure and determine such infiltration rate would therefore be highly desirable to assist in the analysis and improve performance and comfort of motor vehicles and similar structures such as unpressurized airplane cabins, train passenger cars and the like.

SUMMARY OF THE INVENTION

An apparatus and method for measuring the infiltration flow rate into the passenger compartment of a moving motor vehicle includes a controlled source of a gas such as carbon dioxide ($CO_2$), a plurality of sensors disposed about the passenger compartment which provide data from which the concentration of such gas over time can be deduced and a multi-channel data storage device which discretely stores the concentration data from such plurality of sensors for later analysis and computation. The decay rate of the gas concentration within the passenger compartment is a function of the infiltration/exfiltration rate and the former rate can be deduced from the latter. Preferably, the vehicle will be stationary and disposed in a wind tunnel. However, testing with moving, remotely controlled vehicles on test tracks is also suitable. The apparatus and method have broad utility to determine infiltration/exfiltration rates of vehicular and non-vehicular compartments and containment structures such as unpressurized airplane cabins, train passenger cars, busses and the like subjected to an airstream.

Thus it is an object of the present invention to provide an apparatus for determining the infiltration/exfiltration rate of air into/out of a motor vehicle passenger compartment while in relative motion with respect to the approach air flow.

It is a further object of the present invention to provide a method of determining the infiltration/exfiltration of air into and or out of a motor vehicle passenger compartment while the vehicle is in motion.

It is a still further object of the present invention to provide an apparatus for measuring the concentration of a released quantity of a gas within a passenger compartment of a motor vehicle in actual or simulated motion to infer the infiltration/exfiltration rate.

It is a still further object of the present invention to provide a method for measuring the concentration of a released quantity of a gas within a passenger compartment of a motor vehicle in actual or simulated motion to infer the infiltration/exfiltration rate.

It is a still further object of the present invention to provide an apparatus for determining the infiltration/exfiltration rate of a compartment or containment structure subjected to an airstream.

It is a still further object of the present invention to provide a method for determining the infiltration/exfiltration rate of a compartment or containment structure subjected to an airstream.

Further objects and advantages of the present invention will become apparent by reference to the following description of the preferred embodiment and appended drawings wherein like reference numbers refer to the same assembly, element, component or feature.

DESCRIPTION OF THE PREFERRED EMBODIMENT

Figure 1:
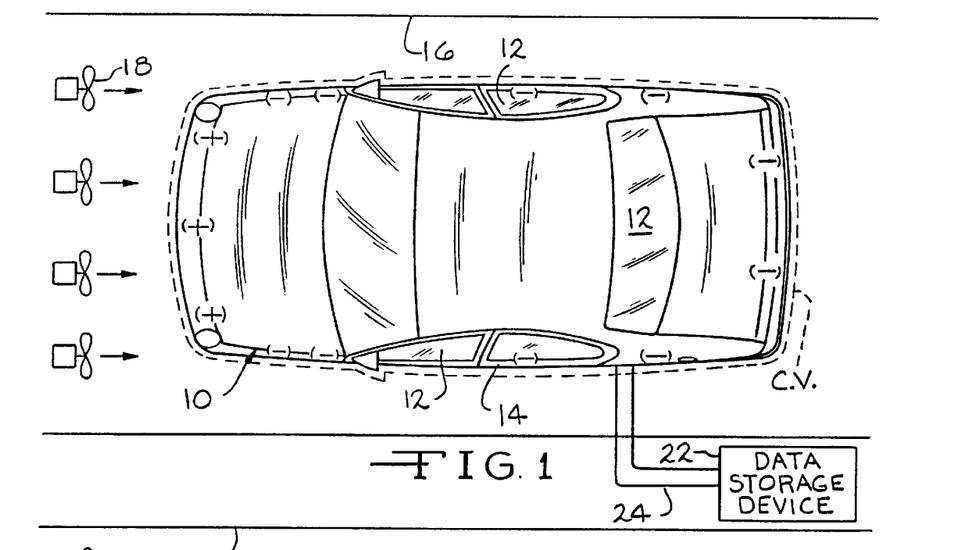
FIG. 1 is a top plan view of a passenger car undergoing an air infiltration/exfiltration test according to the present invention.
Figure 2:
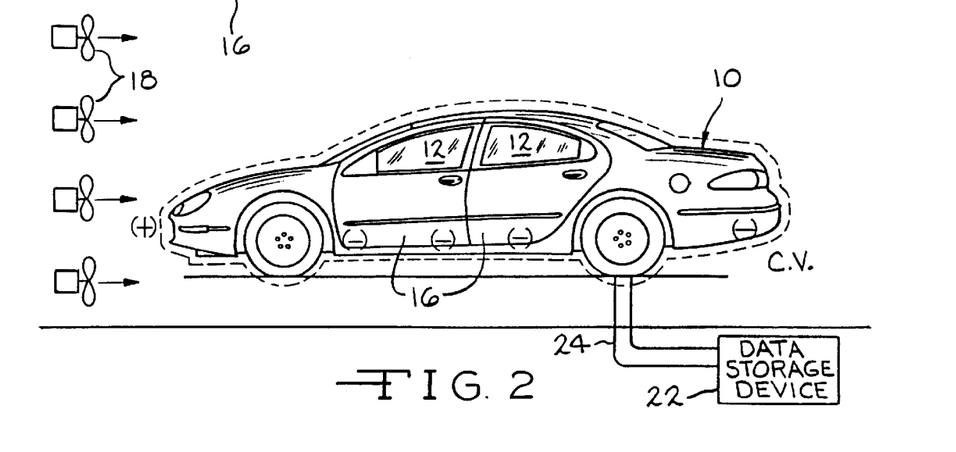
FIG. 2 is a side elevational view of a passenger car undergoing an air infiltration/exfiltration test according to the present invention.
Figure 3:
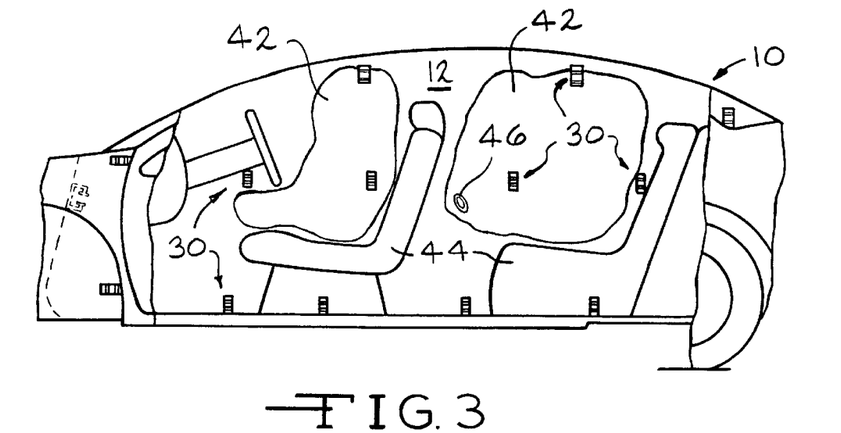
FIG. 3 is a fragmentary, side elevational view in partial section of a passenger car instrumented for an air infiltration/exfiltration test according to the present invention.

Referring now to FIGS. 1, 2 and 3, a motor vehicle 10 which may be a passenger car, sport utility vehicle, pickup truck or station wagon, for example, the motor vehicle 10 defines an interior or passenger compartment 12 which is accessible in conventional fashion through a plurality of hinged doors 14. The motor vehicle 10 may be a mockup, prototype, shell or more typically, an actual vehicle in the mid to latter stages of development and may include passenger seats 16 and other interior components. Given such a motor vehicle 10, the test and quantitative evaluation regarding infiltration and exfiltration of air will be utilized to assist final designs, particularly those relating to door and window seals, door and window moldings and other components and features which include openings or passages between the interior or passenger compartment 12 of the motor vehicle 10 and its exterior and environment.

The motor vehicle 10 is disposed in a wind tunnel 16 having a source of high velocity air such as one or a plurality of fans 18. The fans 18 must be capable of providing air movement through the wind tunnel 16 at a speed generally in the upper range of motor vehicle speeds such as eighty miles per hour (128 kilometers per hour) and preferably in the range of from sixty miles per hour (96 kilometers per hour) to one hundred miles per hour (160 kilometers per hour). A multi-channel data storage device 22 which may be a multi-channel digital or analogue tape recorder or a properly configured computer having discrete multi-channel data storage capabilities is connected through a suitable multi-conductor cable 24 to instrumentation and sensors within the passenger compartment 12 of the motor vehicle 10 to be described directly below.

Figure 4:
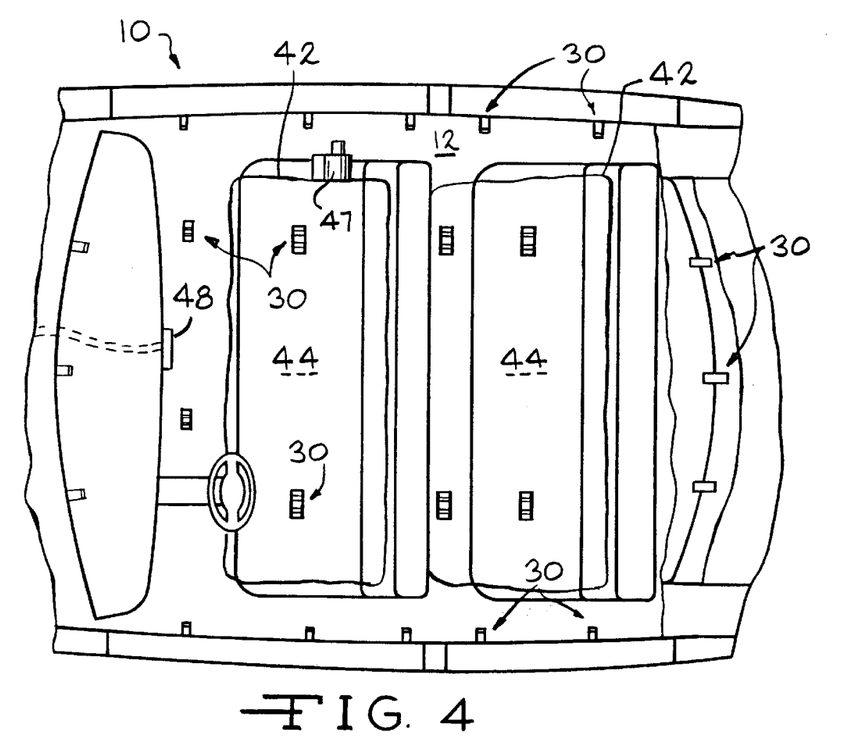
FIG. 4 is a fragmentary, top plan view in partial section of a passenger car instrumented for an air infiltration/exfiltration test according to the present invention.
Figure 5:
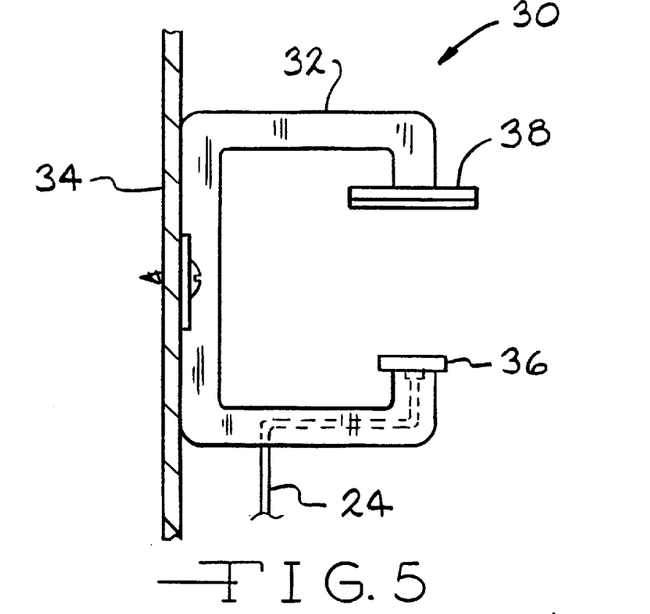
FIG. 5 is an enlarged, side elevational view of an ultrasonic sound speed sensor assembly according to the present invention.

Turning now to FIGS. 3 and 4, the instrumentation within the interior or passenger compartment 12 of the motor vehicle 10 comprises a plurality of sensor assemblies 30 disposed thereabout. Each of the sensor assemblies 30 is mounted to a wall or floor member or panel 34 as illustrated in FIG. 5, and are disposed somewhat uniformly about the interior of the passenger compartment 12 as illustrated in FIGS. 3 and 4. Note that nine of the sensor assemblies 30 are disposed generally along each interior side wall of the passenger compartment 12, three are disposed across the front and the rear, one is disposed in each of the left and right front and rear footwells and four are disposed generally centrally within the passenger compartment 12 adjacent the roof.

It should be understood that the use of thirty-two of the sensor assemblies 30 is generally illustrative and representative as are the specific locations illustrated. More or fewer of the sensor assemblies 30 may be utilized depending upon the size of the passenger compartment 12 and the size and configuration of components such as seats 16 within the passenger compartment 12 and other variables. It should be appreciated that the relatively large number of sensor assemblies 30 facilitates extensive post-test analysis of the recorded data. For example, all the data may be averaged together to provide a gross or average infiltration/exfiltration rate, they may be individually examined to pinpoint leaks and significant infiltration sources and exfiltration sinks or only data from certain sensors (e.g., those located along the lower left door seals) may be examined to focus on a certain area or problem.

As illustrated in FIG. 5, each of the sensor assemblies 30 preferably comprises a generally C-shaped bracket 32 which is attached to a member or panel 34 in the passenger compartment 12. The bracket 32 rigidly mounts and maintains at a defined separation of, for example, 5.9 inches (15 cm) an ultrasonic transceiver transducer 36 which may be a piezoelectric device or similar transducer capable of both operation at ultrasonic frequencies and both transmitting and receiving, i.e., sensing, ultrasonic frequencies. Spaced from the transceiver transducer 36 the aforementioned known and fixed distance is a reflector 38. The reflector 38 defines a smooth, hard, flat or spherically curved surface which reflects ultrasonic waves produced by the transceiver transducer 36 back to the transceiver transducer 36. The transceiver transducer 36 is connected through conductors of the multiple conductor cable 24 to the data storage device 22. As will be explained in more detail subsequently, the sensor assemblies 30 and more specifically the transceiver transducer 36 are provided with short bursts (packets) of high frequency energy and the time which the short burst of energy takes to travel the distance from the transceiver transducer 36 to the reflector 38 and return is recorded in the data storage device 22 for each of the sensor assemblies 30. The transit time recorded reflects the composition of the gas through which the ultrasonic energy packet travels and such data may be utilized to compute the infiltration/exfiltration rate as more fully described below.

Figure 6:
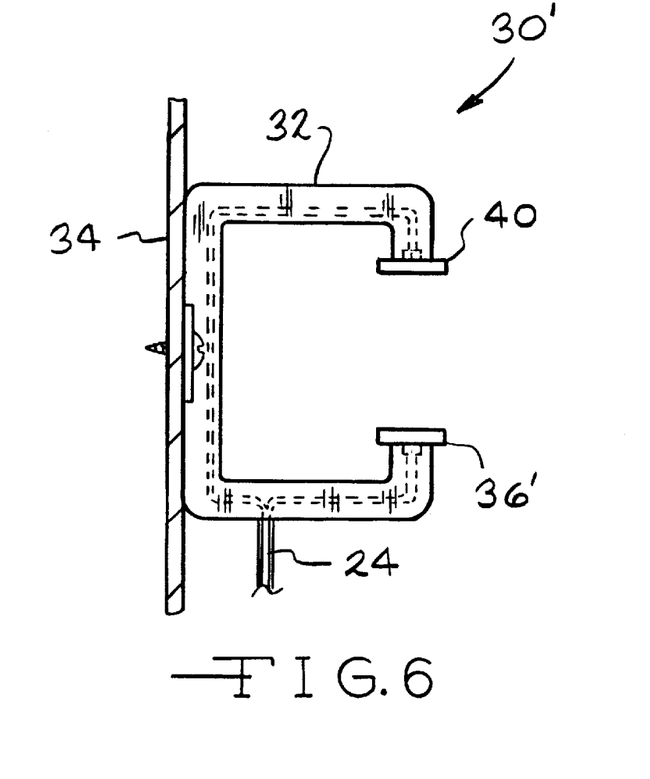
FIG. 6 is an enlarged, side elevational view of a first alternate embodiment ultrasonic sound speed sensor assembly according to the present invention.

FIG. 6 illustrates a first alternate embodiment sensor assembly, each of the sensor assembly 30'. The first alternate embodiment sensor assembly 30' preferably comprises a generally C-shaped bracket 32 which rigidly mounts an ultrasonic transmitter transducer 36' at a defined separation of 5.9 inches (15 cm) from a complementary ultrasonic receiver transducer 40 disposed in opposed (facing) relationship therewith. The transmitter 36' and the receiver 40 are connected through conductors of the multiple conductor cable 24 to the data storage device 22. The transmitters 36' of the sensor assemblies 30 are provided with short bursts (packets) of high frequency energy and the time which the short burst of energy takes to traverse the distance separating the transmitters 36' and the receivers 40 is recorded in the data storage device 22 for each of the sensor assemblies 30 at its specific location. The transit time recorded reflects the composition of the gas through which the sound burst travels and such data may be utilized to compute the infiltration/exfiltration rate as more fully described below.

Returning briefly to FIG. 3, the determination of the infiltration/exfiltration flow rate is achieved by charging the interior or passenger compartment 12 of the motor vehicle 10 with a gas, preferably carbon dioxide ($CO_2$), and then monitoring the reduction over time of the concentration of the carbon dioxide and inferring that such reduction is the result of the replacement of the carbon dioxide with air that has infiltrated the passenger compartment 12. Thus, it is necessary to provide a test gas charging assembly 42 which provides such carbon dioxide or other distinct and therefore identifiable gas. The carbon dioxide is preferably supplied to the passenger compartment 12 by two or more containers 44 which are preferably large flexible thin walled bladders placed upon the passenger seats 16 of the motor vehicle 10. Such containers 44 preferably occupy or displace approximately 5 to 40 percent of the air within the compartment. The containers 44 are preferably filled with carbon dioxide ($CO_2$) and are at slight positive pressure. Each of the containers 44 includes one or more electromechanical valves 46 and/or a powered centrifugal blower 47 which may be activated remotely to allow the carbon dioxide ($CO_2$) within the container 44 to escape into the passenger compartment 12 at a preselected time. Two alternate embodiment test gas supply devices are described below.

Rigid walled containers such as metal tanks wherein the carbon dioxide ($CO_2$) is stored under significant pressure are not desirable inasmuch as release of the contents significantly cools the carbon dioxide and the containers and disturbs the thermal equilibrium of the air within the passenger compartment, thereby interfering with accurate measurements.

Figure 7:
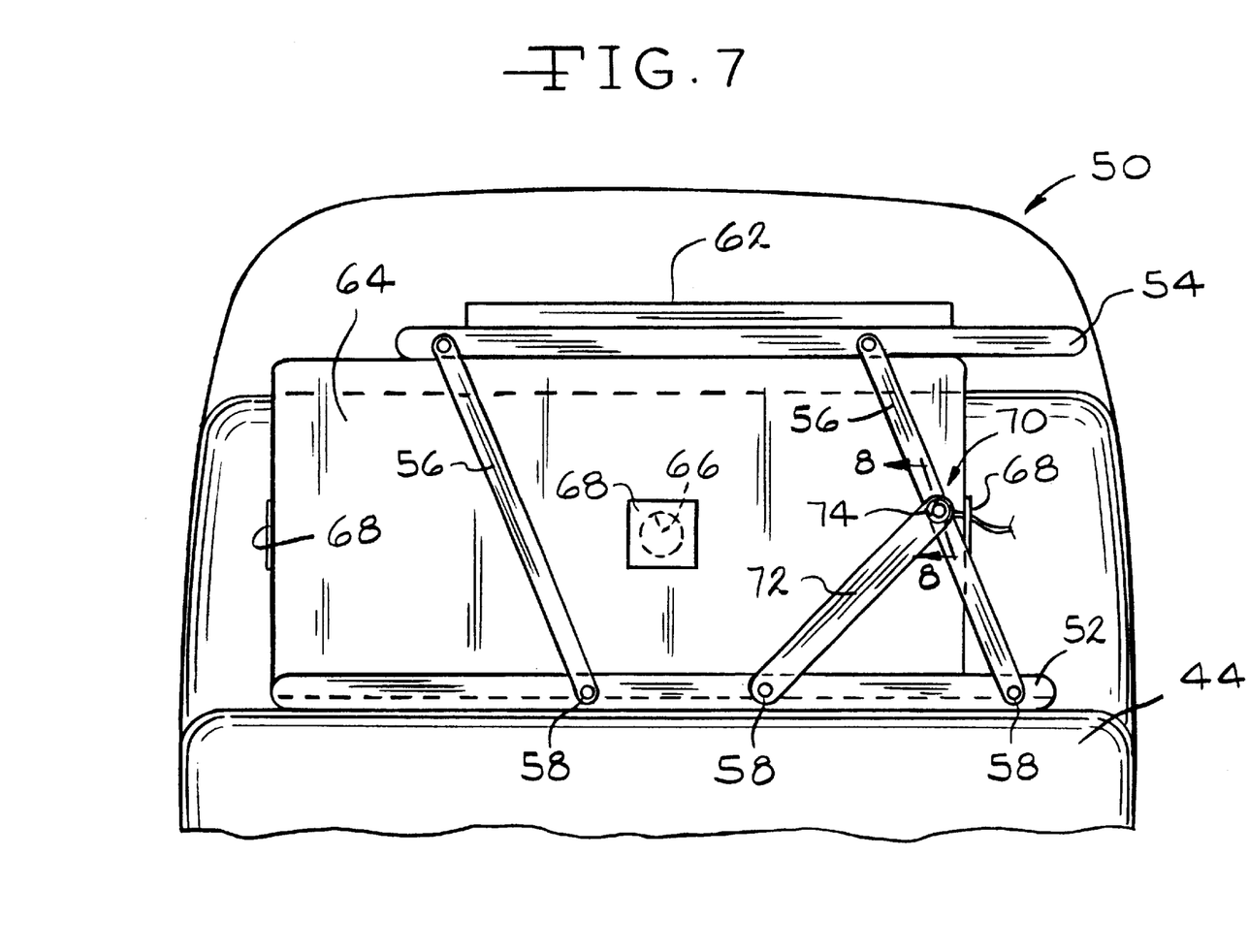
FIG. 7 is a fragmentary, elevational view of a portion of a passenger car instrumented for an air infiltration/exfiltration test illustrating a first alternate embodiment test gas supply.
Figure 8:
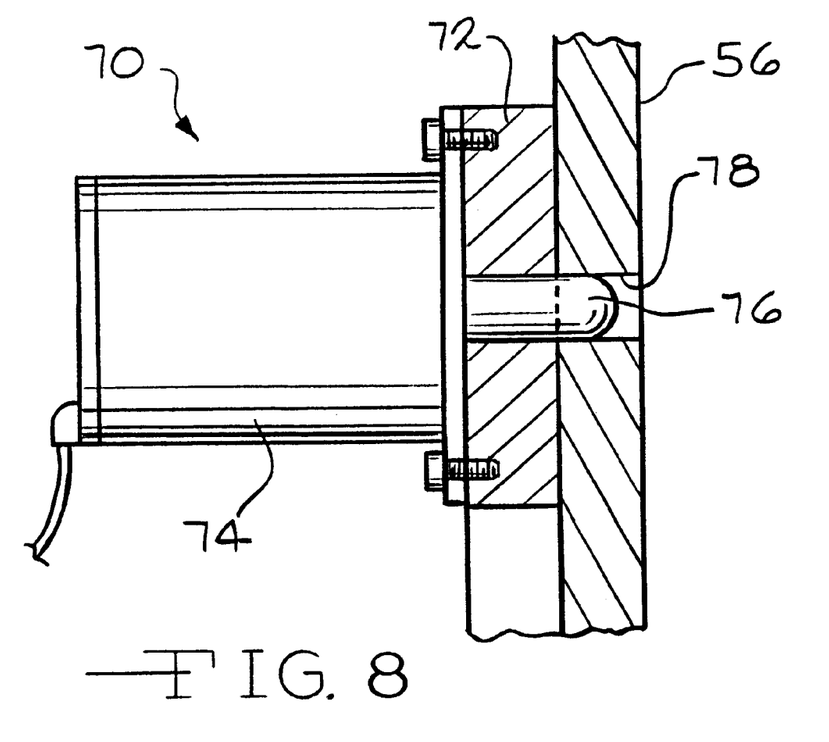
FIG. 8 is a side, elevational view of a portion of a first alternate embodiment test gas supply according to the present invention taken along line 8—8 of FIG. 7.

Referring now to FIGS. 6 and 7, a first alternate embodiment gas charging assembly 50 which may be used singly or in pairs is illustrated. The alternate embodiment gas charging assembly 50 which may be placed upon one or both of the passenger seats 16 of the motor vehicle 10 includes a lower horizontal planar member 52 which rests on the seat 16. The lower planar member 52 is pivotally coupled to an upper planar member 54 by four single pantograph-like connector arms 56 which are pivotally secured at their respective ends to the lower planar member 52 and upper planar member 54 by appropriately disposed pivot pins 58. A weight 62 having a mass of several pounds is placed upon the upper planar member 54. A generally rectangular flexible walled container 64 which is similar to the containers 44 of the preferred embodiment is positioned between the lower planar member 52 and the upper planar member 54 and filled with a traceable gas such as carbon dioxide as described above. A plurality, preferably at least three, apertures 66 are formed in the vertical walls of the container 64 and are closed with an overlying flap 68 which functions as a one-way valve. A latch or release mechanism 70 includes a latch arm 72 which is pivotally secured to the lower planar member 58 by a pivot pin 68. A solenoid 74 or similar electrically or pneumatically activated device includes a release plunger 76 which is received within a suitably disposed aperture 78 formed in one of the connector arms 56.

To provide the necessary supply of carbon dioxide or other tracer gas to the interior 12 of the motor vehicle 10, the container 64 is filled with carbon dioxide or similar gas and placed between the planar members 52 and 54 and the connector arms 56 and the latch arm 68 are disposed as illustrated. When the solenoid 74 is activated, the release plunger 76 is driven toward the bottom of the solenoid 74 and out of the aperture 76 in the pantograph-like connector arm 56. The weight 62 is thus free to and does collapse the container 64 and drive the carbon dioxide or other tracer gas out the ports or apertures 66. Through the first alternate embodiment gas charging assembly 50, gas may also be dispersed within the interior 12 of the motor vehicle 10 which has not undergone significant expansion and cooling as would be the case if it were stored and released from a compact, pressurized container, as discussed above.

Figure 9:
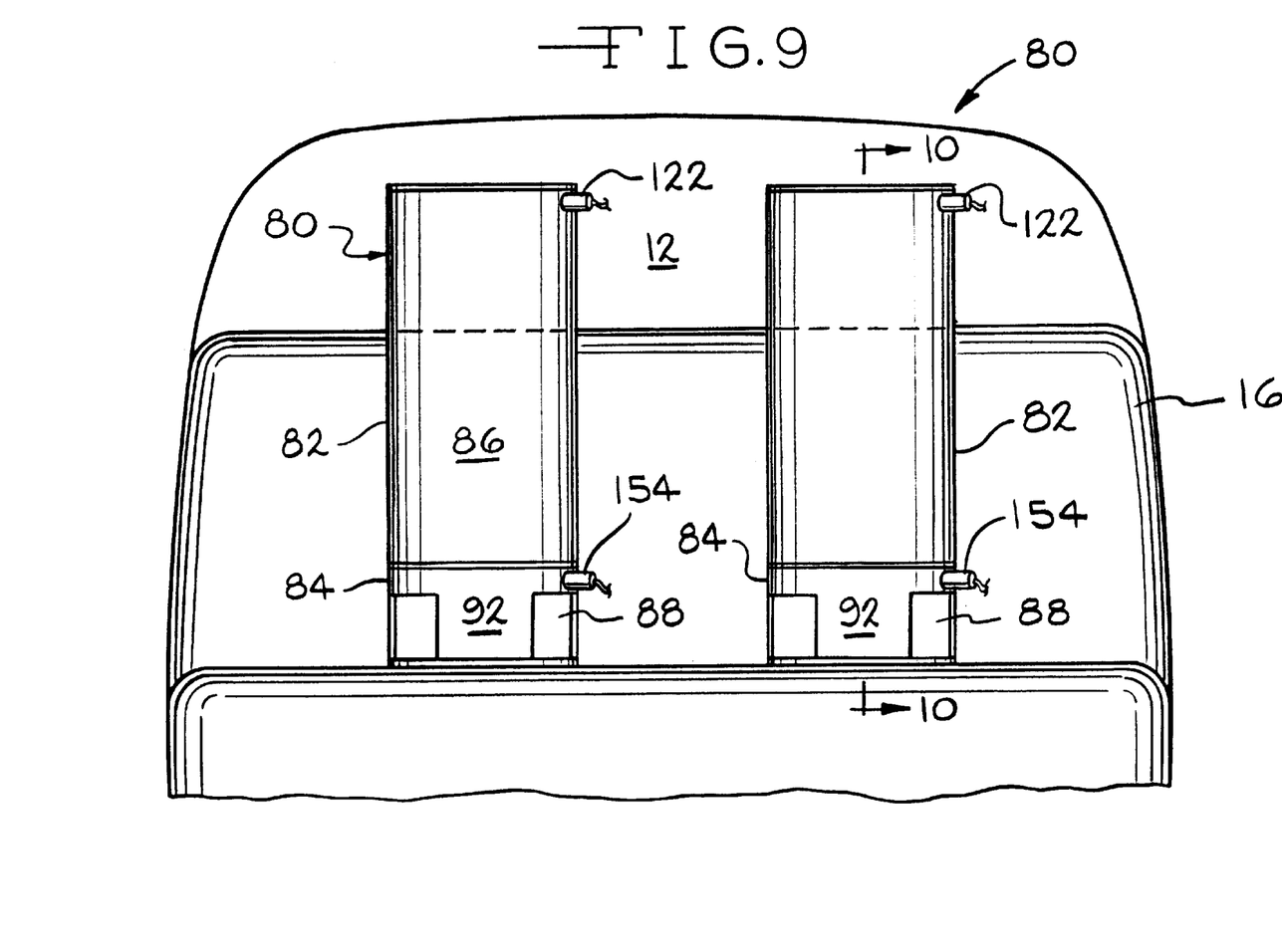
FIG. 9 is a fragmentary, elevational view of a portion of a passenger car instrumented for an air infiltration/exfiltration test illustrating a second alternate embodiment test gas supply.
Figure 10:
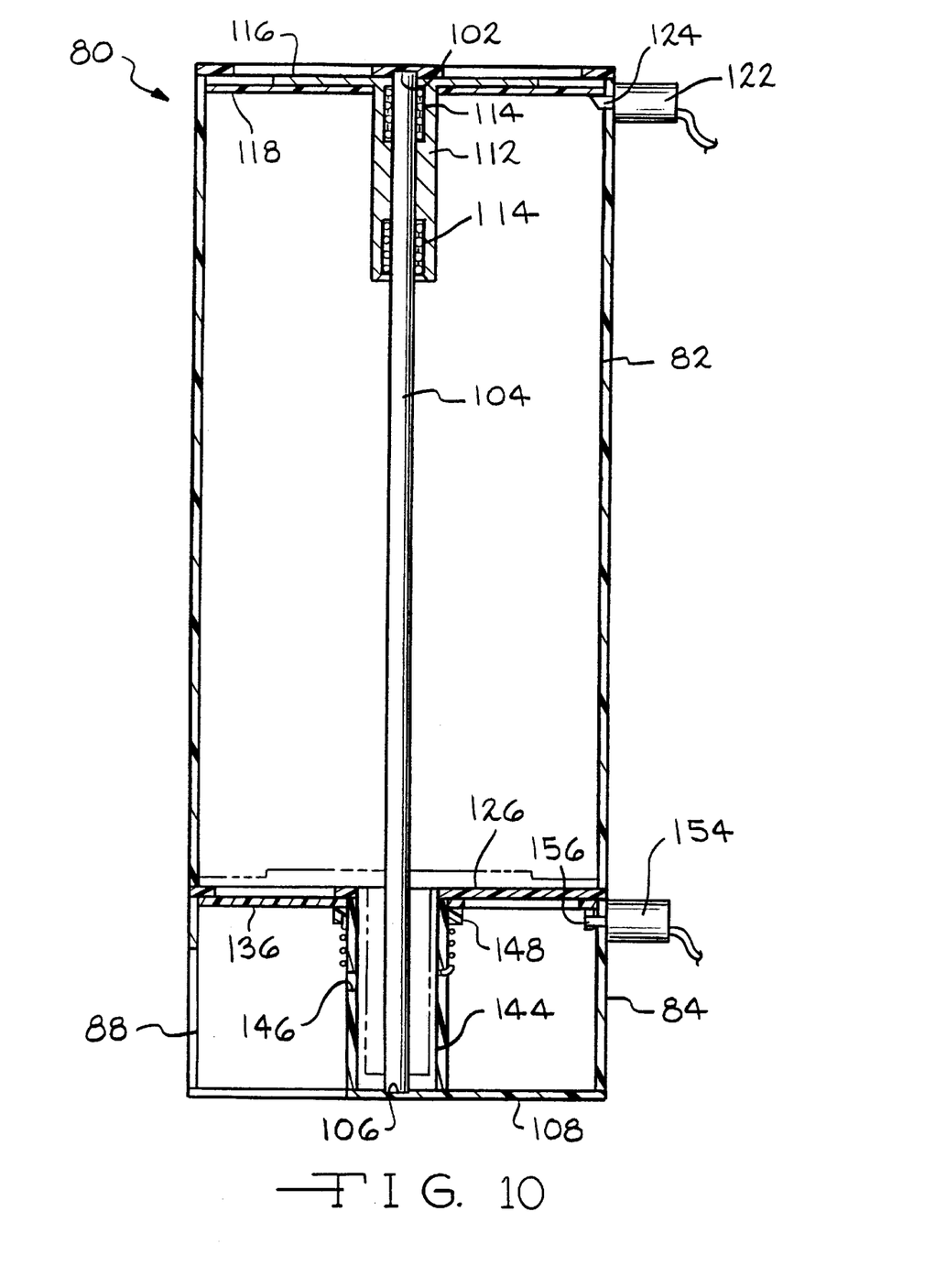
FIG. 10 is a full, sectional view of a second alternate embodiment test gas supply according to the present invention taken along line 10—10 of FIG. 9.
Figure 11:
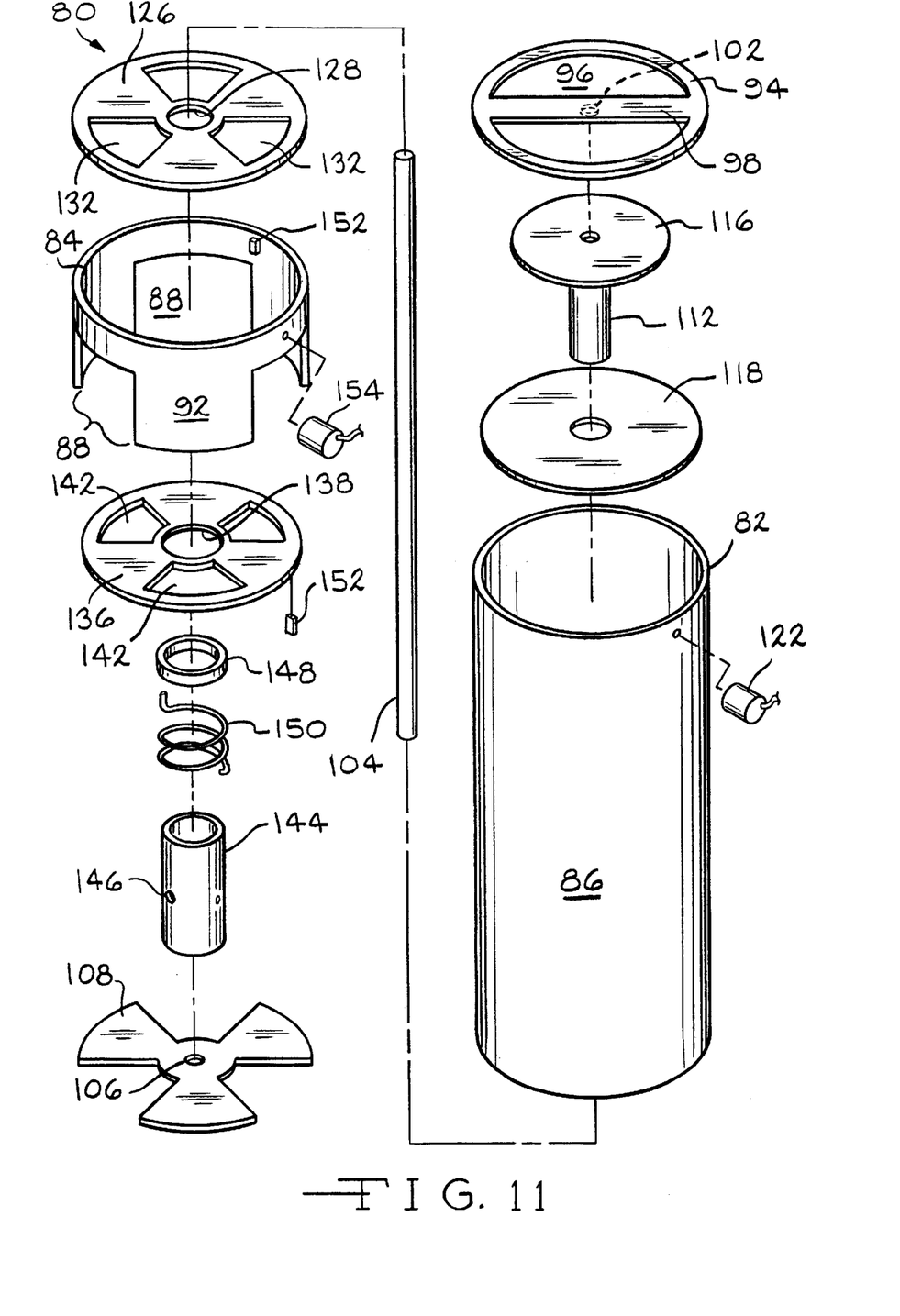
FIG. 11 is an exploded, perspective view of a second alternate embodiment test gas supply according to the present invention.
Figure 12:
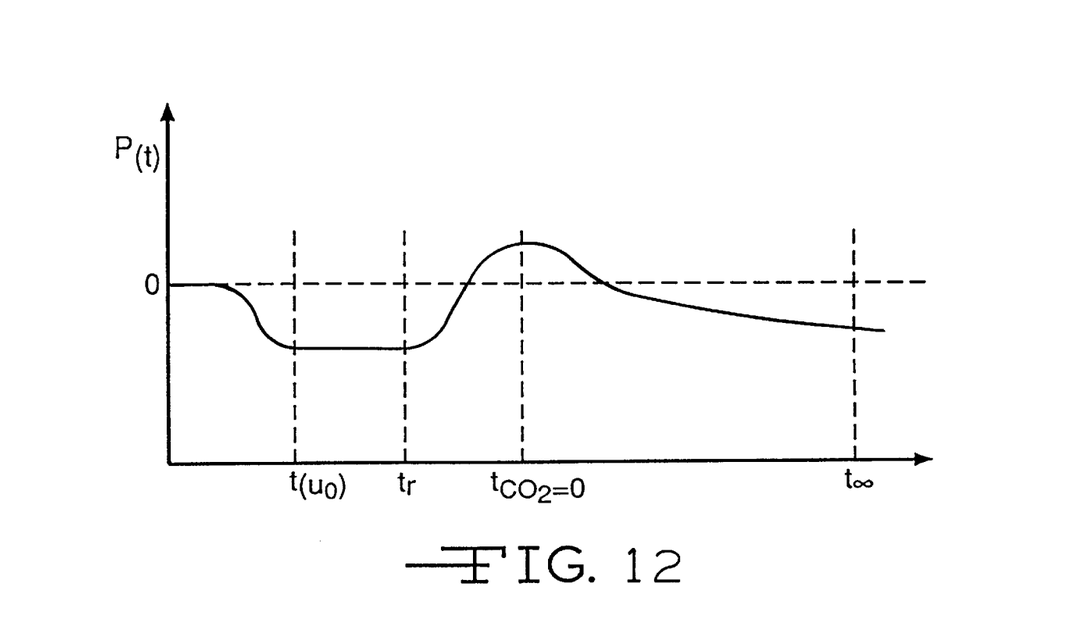
FIG. 12 is a graph presenting pressure within the passenger compartment versus time wherein 0 is atmospheric pressure during a typical infiltration/exfiltration test run according to the present invention.
Figure 13:
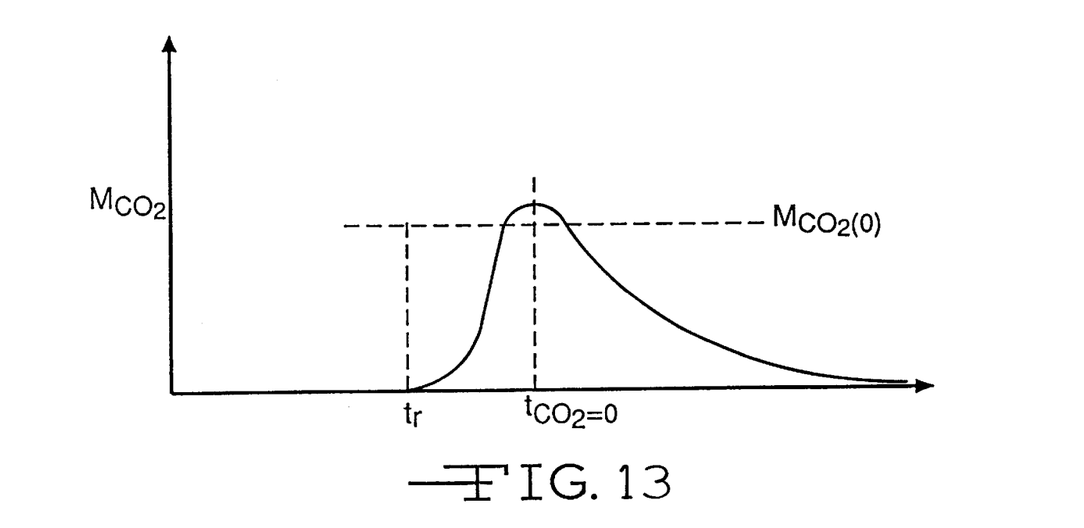
FIG. 13 is a graph of the mass of carbon dioxide ($CO_2$) within the passenger compartment versus time during a typical infiltration/exfiltration test run according to the present invention.

Referring now to FIGS. 9, 10 and 11 a second alternate embodiment gas charging assembly 80 is illustrated. The second alternate embodiment gas charging assembly 80 will preferably be utilized in multiples; three or four of the assemblies 80 provide a sufficient concentration of the test gas such as carbon dioxide within the interior 12 of the motor vehicle 10 to achieve excellent test results. The multiple gas charging assemblies 80 are, once again, preferably disposed on the front and rear seats 16 of the motor vehicle 10 as illustrated. Each of the second alternate embodiment gas charging assemblies 80 include an elongate cylindrical body 82 and a base 84. The body 82 has circumferentially continuous side walls 86 whereas the base 84 defines a castellated bottom having circumferentially equal sized notches or apertures 88 and side wall portions 92.

At the top of the gas charging assembly 80 is positioned a top cap 94 having open regions 96 and a center bar 98 defining an aperture 102 which receives an elongate rod 104 disposed concentrically about the center axis of the body 82. The elongate rod 104 is received within a similar aperture 106 formed in a bottom cap 108 which is secured to the side wall portions 92 of the base 82. Received upon the elongate rod 104 for bi-directional axial translation is a bearing sleeve 112. The bearing sleeve 112 includes a pair of spaced apart linear bearing assemblies 114 which engage the exterior of the elongate rod 104. The bearing sleeve 112 also includes a radially extending flange 116. Secured to the radially extending flange 116 is a disc or piston 118 which has a diameter substantially equal to the inside diameter of the body 82 such that it may translate bi-directional therewithin while providing a reasonably gas tight seal thereagainst. Adjacent the top cap 94 of the body 82 is disposed a first solenoid 122 having a plunger 124 which interferes with the axial travel of the piston or disc 118. If the disc 118 is positioned between the plunger 124 of the first solenoid 122 and the top cap 94 and the solenoid is then activated, the piston or disc 118 will be released to descend toward the base 84.

Disposed between the body 82 and the base 84 of the second alternate embodiment gas charging assembly 80 are a pair of circular discs, one of which is fixed and the other of which is rotatable. A first fixed disc 126 defines a center aperture 128 and three equally spaced apart apertures 132 each occupying slightly less than 60° of arc. Disposed in sliding contact with the fixed disc 126 is a second rotatable disc 136 defining a center opening 138 and three equally spaced apart apertures 142 each extending over slightly less that 60° of arc. The fixed disc 126 and the rotatable disc 136 are, as noted above, disposed adjacent one another and it will be appreciated that from a position in which the apertures 132 and 142 are aligned such that fluid passage therethrough is achieved, rotation of the rotatable disc 136 through approximately 60° of arc will fully close off the apertures 132 and thus terminate fluid flow or communication. The fixed disc 126 is supported by a cylindrical inlet member 144 which extends from the fixed disc 126 to the bottom cap 108 and includes a fill port 146. A reinforcing or bearing member 148 may be secured to the rotatable disc 136 to facilitate its rotation about the inlet member 146.

To achieve rotation of the rotatable disc 136 relative to the fixed disc 126, a watch spring 150 or similar circular spring may be wrapped about the inlet member 144 and one end secured to it and the other end secured to the rotatable disc 136. Suitable interfering stops 152 are mounted upon the rotatable disc 136 and the base 84 to define a limit of rotation driven by the watch spring 150 such that the apertures 132 and 142 are aligned and therefore open. A second solenoid 154 is secured to the base 84 and includes a plunger 156 which interferes with one of the stops 152 on the rotatable disc 136 in its closed position and restrains motion of the disc 136 against the force of the spring 150. When the second solenoid 154 is activated, retraction of the plunger 156 permits the rotatable disc 136 to rotate approximately 60° and open the apertures 132 in the fixed disc 126.

To charge the second alternate embodiment assembly 80, the rotatable disc 136 is rotated such that the apertures 132 are closed and it is restrained by the plunger 156 of the second solenoid 154. At this time, the piston or disc 118 will be at its lowermost position, adjacent the fixed disc 126. The first solenoid 122 may be activated at this time. Carbon dioxide or other gas is then supplied through the fill port 146 in the inlet member 144 and the interior of the body 82 is filled with carbon dioxide as the piston or disc 118 rises. When the piston or disc 118 is driven to its uppermost limit of travel, adjacent the top cap 94, the first solenoid 122 is deactivated such that the plunger 124 restrains the disc or piston assembly 118 against downward motion. When it is desired to discharge the carbon dioxide from the charging assembly 80, both of the solenoids 122 and 154 are activated, releasing the piston or disc 118 and opening the apertures 132 thereby releasing the carbon dioxide.

As a further alternative, the carbon dioxide may be provided to the passenger compartment 12 of the motor vehicle 10 through pipes, conduits or the like (not illustrated). However, the use of the self-contained internal containers 44 or 64 has the advantage of eliminating piping or conduits from the exterior of the motor vehicle 10 to its interior as well as the need to create openings in the body of the vehicle 10 to accept such conduits thereby permitting more accurate simulation of the vehicle and its operating conditions.

Finally, the instrumentation in the passenger compartment includes at least one sensor assembly 48 which provides data to the data storage device 22 over the multi-conductor cable 24. Preferably, the sensor assembly 48 includes an electric air pressure (barometric) sensor and temperature sensor such as a thermistor which provide signals and information regarding the instantaneous air or mixture pressure with respect to the static pressure of the approach air and the temperature of the air within the passenger compartment 12 of the motor vehicle 10.

Test Operation

Referring now to FIG. 6, the motor vehicle 10 whose $\dot{m}_i$ value at a given relative flow speed (i.e., the speed of the approach air with respect to the vehicle) is desired, is placed in the wind tunnel 16, outfitted with the appropriate sensor assemblies 30 as described above and connected to the data storage device 22. Once the fans 18 of the tunnel have started and the interior pressure of the passenger compartment 12 comes to equilibrium: $(p(U_o)<p_{atm})$, this pressure value will be sensed by the air pressure sensor 48 and recorded on the data storage device 22 and used as a reference condition for subsequent measurements. Note, if the vehicle is aerodynamically bluff, then $p(U_o)$ may be larger than $P_{atm}$.

The large, flexible wall containers 44 filled with $CO_2$ will have been placed in the passenger compartment prior to the initiation of the test and will have reached temperature equilibrium with the surroundings 12.

Following the establishment of $P(U_o)<P_{atm}$, the electromechanical valves 46 will be energized and the $CO_2$ will be released from the containers 44 with the consequence of a slight pressure rise within the passenger compartment 12. The time of this release will be designated as $t_r$ and the symbols $(t_{CO_2}=0)$ and $M_{CO_2}(0)$ will designate the time at which the initial mass of the $CO_2$ in the compartment is established.

The corresponding pressure at the time of $t_{CO_2}(0)$ will be larger than $p(U_o)$ as a result of the introduction of $CO_2$ from the containers 44 into the passenger compartment 12. It is assumed that the excess $CO_2$, that is, the $CO_2$ that leads to a pressurization of the passenger compartment 12, will leak to the surroundings in a relatively short time. A smaller, residual over-pressure will remain in the passenger compartment 12 as a result of the larger molecular weight of the $CO_2$ as described below.

The natural infiltration and exit leakage of the (air+$CO_2$) mixture will cause the $CO_2$ to be displaced by fresh air. However, since the outflow is delivering a mixture of density greater than pure air, the driving pressure $[p(t)-p_{exterior}]$ will necessarily be larger than $[p(U_o)-p_{exterior}]$. Hence, there will be a decay process in which $p(t) \rightarrow p(U_o)$.

By monitoring $p(t)$, it is inferred that the condition for which $\dot{m}_i(t) \rightarrow \dot{m}_i(\infty)$ can be identified given $p(t) \rightarrow p(U_o)$. Also, it will be possible to infer $\dot{m}_i(t) \rightarrow \dot{m}_i(\infty)$ by observing the time for which the $CO_2$ concentration approaches zero.

FIGS. 1 and 2 illustrate a control volume (CV) that has been placed around the motor vehicle 10. The external surface of the CV is the external surface of the motor vehicle 12.

The conservation of mass for this CV can be expressed as (from, e.g., Potter, M. C. and Foss, J. F. *Fluid Mechanics* (1975))

$$0 = \frac{d}{dt}\int_{cv}\rho d\forall + \int_{cs}\rho \vec{V} \cdot \hat{n} dA. \qquad (2)$$

Per the above discussion, the symbol $\dot{m}_i$ represents the desired quantity: the infiltration mass flow rate of air into the passenger compartment 12 of the motor vehicle 10. Equation (2) can be written in terms of $\dot{m}_i$ as $$0 \frac{d}{dt}\int \rho d\forall + \int_{A_{exit}} \rho \vec{V} \cdot n dA - \dot{m}_i \qquad (3)$$

$$(I) \qquad (II) \qquad (III)$$

where $A_{exit}$ is defined as the sum of the area segments at which mass leaves the motor vehicle 10. The $\rho$ values in equation (3) represent, in general, the density, $\rho_m$, of the gas mixture: air plus $CO_2$.

As noted above, term I of equation (3) is zero when $p=p(U_o)$ before the released carbon dioxide is flushed from the passenger compartment 12 of the motor vehicle 10. However, during the transient period: $t_{CO_2=0} \leq t \leq t_{28}$, measurements—which can be used to approximate term I and an inferred time dependent history for $\rho_m(t)$ at the exiting locations—can be combined to infer $\dot{m}_i(t)$.

Figure 14:
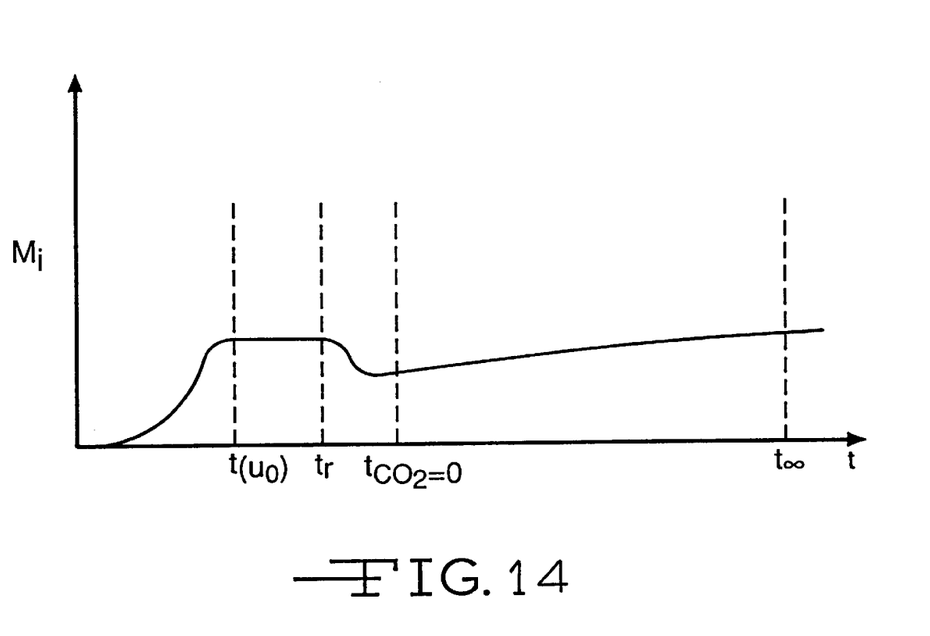
FIG. 14 is a graph of the infiltration mass flow rate versus time during a typical infiltration/exfiltration test run according to the present invention.

As illustrated in FIG. 14, since $\dot{m}_i(t)$ will increase to $\dot{m}_i(\infty)$ as the interior pressure is decreased to $p(U_o)$, an extrapolation of the $\dot{m}_i(t)$ magnitudes will yield the desired infiltration rate.

Equation (2) can be equivalently written for carbon dioxide as well as the air/carbon dioxide mixture that is described by equation (2). That is, $$0 = \frac{d}{dt}\int_{cv} \rho_{CO_2} d\forall + \int_{cx} \rho_{CO_2} \vec{V} \cdot \vec{n} dA \qquad (4)$$

$$= \frac{d}{dt}\int_{cv} \rho_{CO_2} d\forall + \int_{A_{exit}} \rho_{CO_2} \vec{V} \cdot \hat{n} dA$$

$$(\text{I}_c) \qquad\qquad (\text{II}_c)$$

Note that there is (effectively) no influx of carbon dioxide; hence, term $\text{I}_c$ is simply balanced by the efflux of carbon dioxide as described by $\text{II}_c$.

Consider that experimental techniques to evaluate term I of equation (3) and term $\text{I}_c$ of equation (4) are available. Specifically, $$\rho_m(x_j,y_j,z_j,t) \text{ and } \rho_{CO_2}(x_j,y_j,z_j,t)$$

will be determined at a sufficient number of locations within the passenger compartment 12 that the integral values of I and $\text{I}_c$ will be adequately approximated. The spatial average of $\rho_{CO_2}$ in the interior (i.e., $<\rho_{CO_2}>$) will be assumed to exist at the exiting areas such that (4) can be written as $$0 = \forall \frac{d}{dt}\langle \rho_{CO_2} \rangle + \langle \rho_{CO_2} \rangle q_{exit}. \qquad (5a)$$

$$(\text{I}_c) \qquad\qquad (\text{II}'_c)$$

The symbol $\forall$, which represents the volume of the passenger compartment 12, times the time derivative in equation (5) is equal to $\text{I}_c$ in equation (4) by definition. The central assumption of the present method is contained in the presumed equality of $\text{II}_c$ and $\text{II}'_c$ where $q_{exit}$ is the volume flow rate of the exiting gas. Namely, $$q_{exit} = \int_{A_{exit}} \vec{V} \cdot \hat{n} dA \qquad (5b)$$

As stated above, $\text{I}_c$ can be approximated by measurements. Hence, $q_{exit}$ will be inferred from equation (5a).

The symbol $\text{I}_c''$ is now introduced to differentiate between the mathematically defined $<\rho_{CO_2}>$ in equation (5a) and the experimentally defined $<\rho''_{CO_2}>$ that will be determined by the procedures in the next section. The resulting equation, which can be balanced experimentally, is $$0 \approx \forall \frac{d}{dt}\langle \rho''_{CO_2} \rangle + \langle \rho''_{CO_2} \rangle q_{exit} \qquad (5c)$$

$$\text{I}_c'' \qquad\qquad \text{II}_c''$$

The approximate equality represents both the assumption regarding the density in $\text{II}_c''$ and the measurement uncertainty between $\text{I}_c''$ and the mathematical quantity $\text{I}_c$.

Returning to equation (3) for the time period between $t_{CO_2=0}$ and $t_\infty$, and using the symbol $(\ )_m$ to denote properties of the $CO_2$+air mixture and $(\ )''$ to denote measured quantities, the equivalent of equation (3) becomes $$0 \approx \forall \frac{d}{dt}\langle \rho''_m \rangle + \langle \rho''_m \rangle q_{exit} - \dot{m}_i \qquad (6)$$

$$\text{I}''_m \qquad\qquad \text{II}''_m$$

where the approximate equality is as described for equation (5c) above.

Equation (6) has the same integrity as equation (5c). Terms $\text{I}_m''$ and $\text{II}_m''$ can, therefore, be determined in equation (6) and the desired $\dot{m}_i(t)$ can be inferred as the sum of these two terms. (Note that $\text{I}_m''<0$ and $\text{II}_m''>0$).

It can be expected that $\dot{m}_i(t)$ will gradually approach $\dot{m}_i(\infty)$ as indicated in FIG. 14. It is important to note that the discrete measurements to be used for the evaluation of $\text{I}_m''$ in equation (6) can be expected to exhibit scatter about a smooth distribution that would represent the behavior of I in equation (3). This scatter, however, will be a result of random processes and a smoothed representation of the terms in equation (6) should be readily extracted from the data. This expectation has been confirmed by measurement at Michigan State University in January, 1999.

The following section defines the strategy to infer $<\rho''_{CO_2}>$ and $<\rho''_{air}>$ that are required to implement the above described $\dot{m}_i(t)$ evaluation. For convenience, these designations are changed to: $(\ )_c$ for $(\ )_{CO_2}$ and $(\ )_A$ for $(\ )_{air}$.

Experimental Technique
Thermodynamic Considerations

Consider that the $CO_2$ and the air temperatures and pressures are in equilibrium for all relevant times of this analysis. Hence, for $\rho_m$ as the mixture density:

$$\rho_m = \rho_c + \rho_a \qquad (7a)$$

and $$1 = \rho'_c + \rho'_a \qquad (7b)$$

where all terms in equation (7) are evaluated at $(x_j, y_j, z_j, t)$ which represents a discrete position in space for the specified instant (t). The $\rho'_c$ and $\rho'_a$ quantities are equivalent to the concentrations of $CO_2$ and air, respectively.

A speed-of-sound technique will be used to infer $\rho_m$ at an adequate number of locations within the passenger compartment 12. The sound speed (a) can be described as $$a = \sqrt{\gamma RT} \qquad (8)$$

where $\gamma$=ratio of specific heats ($\gamma=c_p/c_v$), and R=gas constant. For this binary mixture $$\gamma_m = \rho'_c \gamma_c + \rho'_a \gamma_A$$

and $$R_m = \rho'_c R_c + \rho'_a R_A.$$

Using the thermodynamic quantities:

$$R_C = 0.189 \frac{kJ}{Kg°K} \quad \gamma_C = 1.289$$

$$R_A = 0.287 \frac{kJ}{Kg°K} \quad \gamma_A = 1.4,$$

and developing a relationship for the sound speed of the mixture ($a_m$) in terms of the sound speed for air alone ($a_A$), the following equation can be developed. Specifically, $$\frac{a_m}{a_A} = \{[1 - \rho'_a)c_1 + \rho'_a][(1 - \rho'_a)c_2 + \rho'_a]\}^{1/2} \quad (9a)$$

where $$c_1 = \gamma_c/\gamma_A = (1.289/1.4) = 0.921 \quad (9b)$$

and $$c_2 = R_c/R_A = (0.189/0.287) = 0.659 \quad (9c)$$

Figure 15:
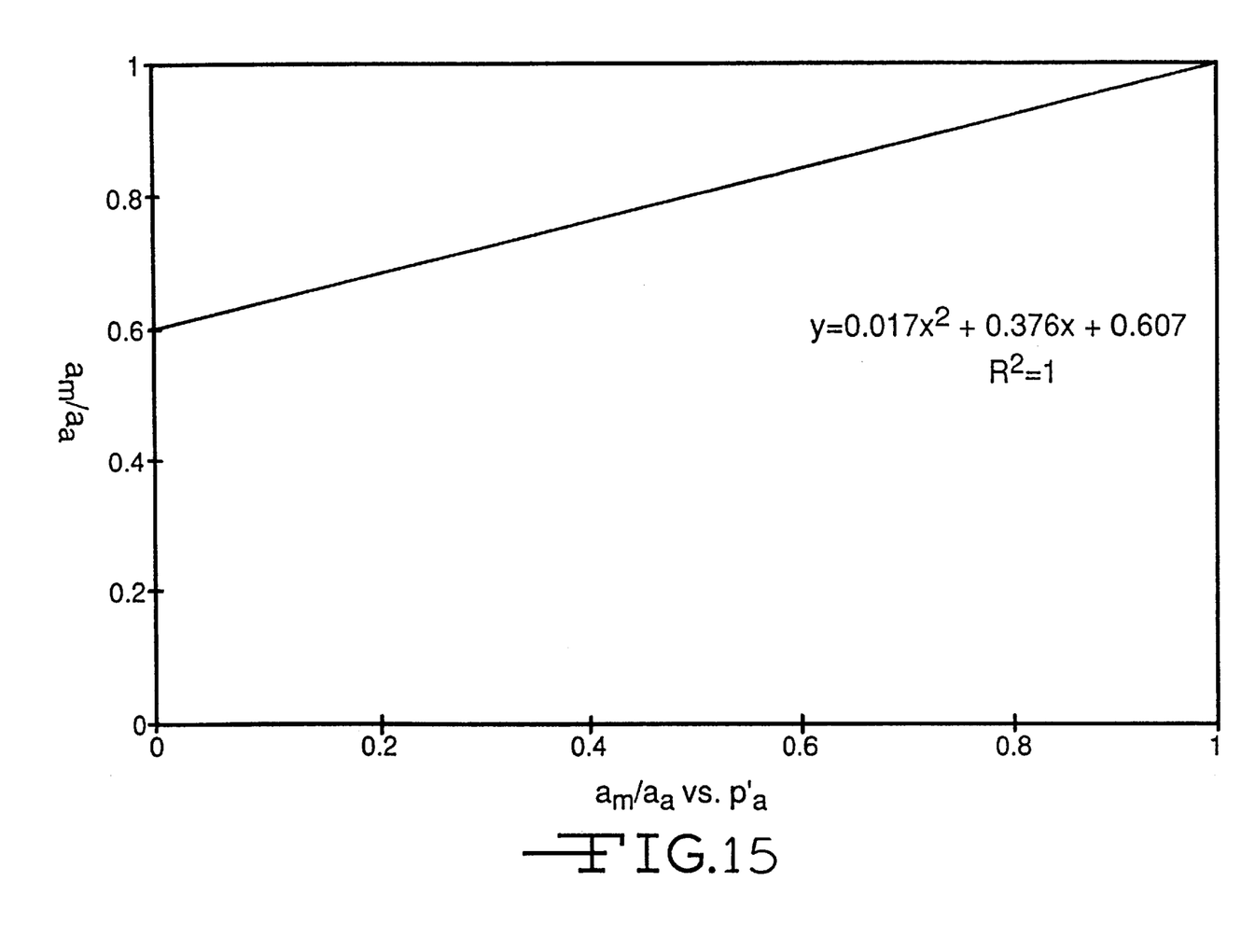
FIG. 15 is a reference graph of the sound speed ratio ($a_m/a_A$) for various mixtures of air and carbon dioxide ($CO_2$) mixtures.

Equations (9a), (9b) and (9c) are represented in graphical form in FIG. 15.

The magnitude of $\rho''_{CO_2}$ that is required for the evaluation of $q_{exit}$ in (5c), can be obtained using the following steps.

i) The sound speed, in pure air, can be solved for explicitly from $$\alpha_A(t \to \infty) = \sqrt{\gamma_A R_A T_A}.$$

Hence, the left hand side denominator of (9a) is known for each of the sensor assemblies 30 once the $CO_2$ has been completely flushed from the compartment 12.

ii) The time dependent $a_M(t)$ values, between the release of the $CO_2$ and its complete extraction from the compartment 12, are known from $$a_M(t) = \left[\frac{a_M}{a_A}\right] a_A. \quad (9d)$$

iii) Since $\alpha_M^2(t)$ can be expressed as $$\alpha_M^2(t) = \gamma_M P_M/\rho_M \quad (9e)$$

and since the (absolute) magnitude of the pressure in the compartment 12 can be measured as a function of time during the depletion of the $CO_2$, the unknown values in (9e) can be expressed as $$\frac{\rho_M}{\gamma_M}(t) = \frac{P_M}{a_M^2}(t) = \lambda(t) \quad (9f)$$

where $\lambda(t)$ is an experimentally known coefficient.

iv) The desired mixture density, $\rho_M(t)$, can therefore be written as $$\rho_M(t) = \lambda(t)\gamma_M(t) \quad (9i)$$
$$= \lambda(t)\left[\frac{\rho_A \gamma_A + \rho_c \gamma_c}{\rho_M}\right]$$
$$= \gamma_A \lambda(t)[\rho'_a + c_1(1 - \rho'_a)]$$

v) The required $CO_2$ concentration can then be evaluated from $$\rho_c(t) = (\rho_c/\rho_M)\rho_M = (1 - \rho'_a)\rho_M. \quad (9j)$$

The (9a) function: $\rho'_a = \rho'_a(\alpha_m/\alpha_A)$ can be expressed as a second order polynomial; namely, $$\rho'_a = \beta_0 + \beta_1\left(\frac{a_m}{a_A}\right) + \beta_2\left(\frac{a_m}{a_A}\right)^2 \quad (10)$$

If equation (10) is evaluated over the range: $0.9 \leq \rho'_a \leq 1.0$, then $\beta_0 = -2.8174$, $\beta_1 = 2.8728$ and $\beta_2 = 0.9446$. As noted, the second order fit is quite adequate for the indicated range of $\rho_a'$ values and this function permits $\rho_a'$ to be inferred if the ratio of sound speeds is known.

Equations (9) and (10) shows that a direct measurement of the sound speed (in a given spatial domain of the compartment 12) will permit the local values of $\rho'_a$ to be determined. With these values at a sufficient number of points in space, $\dot{m}_t(\infty)$ can be computed as described above.

Determination of $\dot{m}_t(t) \to \dot{m}_t(\infty)$

It is envisioned that thirty-two sensor assemblies 30 may be utilized to determine the "semi-local" values of ($a_m/a_A$) and hence the concentration of air (i.e., $\rho_a'$) at the measurement locations.

Several viable methods to determine the $a_m$ value along the length of the measurement path exist. Specifically, over the burst duration of N cycles where, for example, N=4, the ultrasonic output for each pair of transmitters 36' and receivers 40 can be processed to evaluate the time-of-flight of the wave packet.

Specifically, consider that the frequency of the four-cycle burst is 40 KHz and that the distance traveled is nominally 15 cm. The burst duration:

$$\Delta t_B = 4 \text{ cycles}/40 \text{ KHz} = 10^{-4} \text{ sec}$$

whereas the transit time ($\Delta t_T$) will be nominally $$\Delta t_T = 15 \text{ cm}/3.4 \times 10^4 \text{ cm/sec} = 4.4 \times 10^{-4} \text{ sec}.$$

Hence, the responding receiver 40 can be "blanked" for the duration of the "send" pulse (thereby eliminating noise effects related to vibration modes in the support member) and the receiver 40 can then be interrogated to identify the passage of a "pulse train." This will obviate the need to respond to a particular or detailed feature of the transmitted signal which will simplify the time-of-flight evaluation. Alternatively, the receiver 40 can be replaced by a spherical reflector cap such that the emitter "receives" the chirp. In this case the transit length would be 30 cm.

The received signal can be processed with a high speed (e.g., 10 MHz) A/D converter. It is estimated that the uncertainty in the processed signal will be ca ±2 "aperture times" or ±0.2 microsec. Hence, the time-of-flight will be resolved to $$\frac{2 \times 10^{-4} \text{ msec(resolution)}}{0.882 \text{ msec(time-of-flight)}} \approx 1 \text{ part in } 4{,}385$$

More importantly, the capacity to resolve the $\rho'_A$ value given that $\rho'_A$ is of order 0.99 can be assessed.

$$\delta\rho'_a = \frac{\partial \rho'_a}{\partial(a_m/a_A)}\bigg]_{\rho'_A \to 1} \partial(a_m/a_A)$$
$$= \left[1.8892\left(\frac{a_m}{a_A}\right) + 2.8728\right]\frac{1}{4{,}385}$$
$$= \left[(1.8892)(0.027\rho'^2_a + 0.366\rho'_a + 0.607)^{1/2} + 2.8728\right]\frac{1}{4{,}385}$$

-continued $$= 1.09 \times 10^{-3} \text{ at } \rho'_a = 0.99$$

and $$= 1.08 \times 10^{-3} \text{ at } \rho'_a = 0.9$$

This resolution is quite adequate for the present purpose. Note that these thirty-two discrete measurements will be combined to approximate the integral value of the concentration in the passenger compartment 12. The uncertainty of the integration, i.e., the approximation of the integral value from the discrete measurements, will dominate the evaluation of $<\rho_a>$. Hence, the available resolution in the determination of the discrete $\rho_\alpha'$ values is quite satisfactory.

Given that the analysis is referenced to the magnitude of $(a_m/a_A)$, the measurement system can also be self-calibrated by recording the transit time of a pulse in the air environment either prior to the initiation of the $CO_2$ discharge or after $\rho'_c \to 0$. Test experience suggests the latter is the preferred technique.

The determination of the spatially averaged $\rho_\alpha'$ value in the space occupied by each of the N sensor assemblies 30 or 30' will contribute to the integrand of $II_m"$ in equation (3). It can be expected that each measurement will exhibit random fluctuations. However, by summing the N values to approximate the integral and by identifying the "smooth" representation of term I (as it experiences an "exponential decay") in equation (3), one can infer $\dot{m}_f(t)$ from that equation.

Hence, the stated objective, of determining the $\dot{m}_f(\infty)$ value, will be met by recording the limiting value of $\dot{m}_f(t)$ as the $CO_2$ is flushed from the passenger compartment 12.

Additional information regarding the location of the leaks can be expected in terms of the records from the individual sensor assemblies 30 or 30' that are placed at the perimeter of the passenger compartment 12.

The foregoing disclosure is the best mode devised by the inventor for practicing this invention. It is apparent, however, that apparatus incorporating modifications and variations will be obvious to one skilled in the art of air infiltration testing. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. An apparatus for determining a rate of air infiltration into an enclosed compartment of a vehicle in an air stream comprising, in combination,
    a gas supply disposed in such enclosed compartment for providing a charge of an air miscible gas,
    a plurality of sensors disposed in such enclosed compartment for detecting a variable related to a concentration of said air miscible gas, and
    means for calculating said concentration of said air miscible gas from said detected variable,
    whereby a rate of air infiltration is determined from said concentration of said air miscible gas over time.

2. The apparatus of claim 1 further including a wind tunnel and wherein said vehicle is disposed in said wind tunnel.

3. The apparatus of claim 1 wherein said gas supply includes at least one thin wall bladder defining an interior and a blower for selectively withdrawing gas from said bladder.

4. The apparatus of claim 1 wherein said gas supply includes at least one thin wall bladder defining an interior and at least one valve for selectively providing communication between said interior and said enclosed compartment.

5. The apparatus of claim 1 wherein said air-miscible gas is carbon dioxide.

6. The apparatus of claim 1 wherein said plurality of sensors include ultrasonic transducers.

7. The apparatus of claim 1 wherein said plurality of sensors include ultrasonic transducers for measuring the speed of sound and means for calculating said concentration from such speed of sound measurement.

8. The apparatus of claim 1 further including a data storage device associated with said plurality of sensors.

9. An apparatus for determining a rate of air infiltration into an occupant compartment of a vehicle in an air stream comprising, in combination,
    a gas supply for providing a measurable concentration of an air miscible gas in such compartment,
    at least one sensor disposed in such occupant compartment for detecting a variable related to a reducing concentration of said air miscible gas in such occupant compartment, and
    means for repeatedly reading said detected variable of said sensor and calculating said concentration of said air miscible gas over time.

10. The apparatus of claim 9 wherein said rate of infiltration is equal to a rate of exfiltration from said compartment.

11. The apparatus of claim 9 wherein said gas supply includes a gas filled bladder disposed in a frame having a selectively releasable top.

12. The apparatus of claim 9 wherein said gas supply includes at least one canister having at least one selectively openable outlet port.

13. The apparatus of claim 9 wherein said variable is a speed of sound.

14. The apparatus of claim 9 wherein said gas supply includes at least one thin wall bladder defining an interior and a blower for selectively withdrawing gas from said bladder.

15. The apparatus of claim 9 wherein said air miscible gas is carbon dioxide.

16. The apparatus of claim 9 wherein said sensor includes an ultrasonic transducer.

17. The apparatus of claim 9 further including a plurality of sensors disposed about said compartment.

18. The apparatus of claim 9 further including means for storing data from said sensor.

19. A method for determining a rate of air infiltration into a compartment of a vehicle in an air stream comprising the steps of: providing an air miscible gas to such compartment to raise a concentration of such air miscible gas to a measurable concentration, measuring a reducing concentration of such gas in such compartment over time as such air miscible gas is replaced by infiltrating air and inferring such air infiltration from such reading concentration of such gas over time.

20. The method of claim 19 wherein said rate of infiltration is equal to a rate of exfiltration from said compartment.

21. The method of claim 19 further including the step of disposing such vehicle in an air stream.

22. The method of claim 19 further including providing at least one source of such air miscible gas within such compartment.

23. The method of claim 19 wherein said measuring step includes the steps of measuring the speed of sound in such compartment and calculating the concentration of such air miscible gas.

24. The method of claim 23 wherein such speed of sound is determined at a plurality of locations in such compartment and such plurality of determinations are repeatedly calculated.

25. The method of claim 19 further including the step of providing a plurality of gas concentration sensors and storing data from such plurality of gas concentration sensors.

26. The method of claim 19 further including the step of positioning a plurality of gas concentration sensors in such compartment.

* * * * *